US009856023B1

(12) United States Patent
Baldwin (10) Patent No.: US 9,856,023 B1
(45) Date of Patent: Jan. 2, 2018

(54) APPARATUS AND METHOD FOR CLEANING A WASTE LINE OF AN AIRCRAFT (71) Applicant: L.A. Hydro-Jet & Rooter Service Inc., Sun Valley, CA (US)

(72) Inventor: Daniel Boyd Baldwin, Stevenson Ranch, CA (US)

(73) Assignee: L.A. Hydro-Jet & Rooter Service Inc., Sun Valley, CA (US)

( * ) Notice: Subject to any disclaimer, the term of this patent is extended or adjusted under 35 U.S.C. 154(b) by 182 days.

(21) Appl. No.: 14/033,080

(22) Filed: Sep. 20, 2013

Related U.S. Application Data (60) Provisional application No. 61/704,109, filed on Sep. 21, 2012.

(51) Int. Cl.
*B64D 11/02* (2006.01)

(52) U.S. Cl.
CPC ..................... *B64D 11/02* (2013.01)

(58) Field of Classification Search
CPC ... B08B 9/0495; B08B 9/0321; B08B 9/0325; B08B 9/049; B08B 9/0558; B05B 1/042; B05B 1/048; E03C 1/30; E03C 1/304; E03F 9/00
USPC ... 134/167 C, 22.12, 169 C, 169 R, 171, 21, 134/22.11, 22.13, 24, 8; 239/589, 597
See application file for complete search history.

(56) References Cited

U.S. PATENT DOCUMENTS

| 3,080,265 A | * | 3/1963 | Maasberg | B08B 9/0495 134/167 C |
| 3,946,459 A | * | 3/1976 | Armstrong | B08B 9/049 15/104.2 |
| 4,312,679 A | * | 1/1982 | Klein, Sr. | E03C 1/304 134/167 C |
| 4,567,926 A | * | 2/1986 | Lichfield | B65B 39/00 141/1 |
| 5,405,087 A | * | 4/1995 | Waryu | B05B 15/0258 118/302 |

(Continued)

OTHER PUBLICATIONS

Landa, Water Cleaning Equipment, Detergents, Parts and Accessories, Jun. 2010, Landa Catalog, p. 84.*

(Continued)

*Primary Examiner* — Michael Barr
*Assistant Examiner* — Tinsae Ayalew
(74) *Attorney, Agent, or Firm* — Stites & Harbison, PLLC; David W. Nagle, Jr.; James R. Hayne (57) ABSTRACT

An apparatus for cleaning a waste line of an aircraft includes: a source of cleaning solution; a hose in fluid communication with the source of cleaning solution; and a nozzle secured to a distal end of the hose and defining one or more holes for expelling the cleaning solution into a waste line. The nozzle may be provided with a protective cover composed of a plastic material that fits over and engages a distal tip of the nozzle and/or a protective ring composed of a plastic material that fits around and engages a central body of the nozzle. The apparatus may further include a connection assembly defining a first port being configured to be connected to the waste line, a second port being configured to receive the hose and the nozzle, and a third port being configured to be connected to a vacuum pump.

10 Claims, 5 Drawing Sheets (56) References Cited

U.S. PATENT DOCUMENTS 5,873,944 A * 2/1999 Lien ................... B08B 9/0321
 134/10
5,909,848 A * 6/1999 Zink ................... B05B 3/003
 188/184
5,988,188 A * 11/1999 Born ................... B08B 9/0433
 134/22.11

OTHER PUBLICATIONS

Boeing, Inc., "777 Aircraft Maintenance Manual, Pressure Washer Cleaning of the Vacuum Waste Lines," Jan. 5, 2012, pp. 706-711.

* cited by examiner

APPARATUS AND METHOD FOR CLEANING A WASTE LINE OF AN AIRCRAFT

CROSS-REFERENCE TO RELATED APPLICATIONS

The present application claims priority to U.S. Provisional Patent Application Ser. No. 61/704,109 filed on Sep. 21, 2012, the entire disclosure of which is incorporated herein by reference.

BACKGROUND OF THE INVENTION

On an aircraft, waste lines run from the individual lavatories to one or more waste collection receptacles in the rear of the aircraft. Such waste lines must be periodically cleaned. Since almost all space in an aircraft is used and occupied, the waste lines are in close proximity to electrical wiring and other equipment. Thus, great care must be used in cleaning such waste lines to ensure that water or other cleaning solutions do not come into contact with electrical wiring or other sensitive equipment in the vicinity of the waste lines.

For certain types of waste lines, such as sewer lines, a hydro jetting process is commonly used to clean the lines. In such hydro jetting processes, water is forced from a hose through a nozzle at high pressure (often in the range of 3500-4000 psi) to scour and clean the waste lines. However, because of the care required in cleaning aircraft waste lines, existing hydro jetting processes cannot be used on an aircraft.

SUMMARY OF THE INVENTION

The present invention is an apparatus and method for cleaning a waste line of an aircraft.

An exemplary apparatus in accordance with the present invention includes: a water tank (or similar source of water or other cleaning solution); a high-pressure supply pump operably connected to and in fluid communication with the water tank; a hose operably connected to and in fluid communication with the supply pump; a nozzle secured to a distal end of the hose; a connection assembly though which the hose and nozzle passes; a vacuum pump operably connected to the connection assembly; and a wastewater collection tank (which is preferably located external to the aircraft) operably connected to and in fluid communication with the vacuum pump.

A waste line of an aircraft is then operably connected to and in fluid communication with the connection assembly. In this regard, the connection assembly is essentially a Y-connector defining three ports that are in fluid communication with one another. The first port of the connection assembly is configured to be connected to the waste line. The second port of the connection assembly is configured to receive the hose and nozzle for introduction of the hose and nozzle into the waste line. The third port of the connection assembly is configured to be connected to the vacuum pump via a vacuum hose. The connection assembly thus provides a sealed fluid communication between the water tank, the waste line, and the wastewater collection tank, which allows the apparatus of the present invention to be used without allowing water or other cleaning solution to come into contact with electrical wiring or other sensitive equipment in the vicinity of the aircraft waste lines.

An exemplary nozzle for use with the present invention directs water passing through the nozzle through one or more holes. For instance, the exemplary nozzle may define two holes located on opposite sides of the nozzle and oriented at approximately 45° angles (and directed rearward) relative to the longitudinal axis of the nozzle. Furthermore, the exemplary nozzle may define two additional holes positioned on opposite sides of the nozzle, which direct the water at approximately 90° relative to the longitudinal axis of the nozzle.

The exemplary nozzle may be provided with a protective cover that fits over and engages a distal tip of the nozzle. This protective cover is preferably made of a plastic material, and the purpose of the protective cover is to prevent metal-to-metal contact between the distal tip of the nozzle and the waste line, thereby eliminating the scratching that can result from such metal-to-metal contact.

The exemplary nozzle may also be provided with a protective ring that fits around and engages a central body of the nozzle. This protective ring is also preferably made of a plastic material, and the purpose of the protective ring is also to prevent metal-to-metal contact between the central body of the nozzle and the waste line.

In practice, an exemplary method for cleaning a waste line of an aircraft in accordance with the present invention commences by disconnecting a selected waste line from its associated water collection tank, thereby providing access to the waste line. The first port of the connection assembly is then connected to the waste line. Once the connection assembly is connected to the waste line, the vacuum hose is connected to the third port of the connection assembly. An opposite end of the vacuum hose is extended outside of the aircraft (for example, through a cargo door) and connected to the vacuum pump. The vacuum pump is connected to and in fluid communication with the wastewater collection tank.

The hose and nozzle are then advanced through the second port of the connection assembly and into the waste line. The vacuum pump is first activated, and debris and wastewater start flowing through the vacuum hose. The supply pump is then activated to supply pressurized water (or other cleaning solution) to the nozzle, and the hose and the nozzle are slowly advanced through the waste line. The distal tip of the nozzle (along with the protective cover) rotates or spins while being advanced through the waste line. The two holes oriented at approximately 90° relative to the longitudinal axis of the nozzle create a direct blast on the inner surface of the waste line, removing calcium and mineral build-up from the inner surface of the waste line. The two holes oriented at approximately 45° relative to the longitudinal axis of the nozzle assist in moving the loosened debris down the waste line and away from the nozzle. Throughout this process, the vacuum pump is drawing debris and wastewater out of the waste line through the connection assembly and the vacuum hose, and then collecting that debris and wastewater in the wastewater collection tank.

DETAILED DESCRIPTION OF THE INVENTION

The present invention is an apparatus and method for cleaning a waste line of an aircraft.

Figure 1:
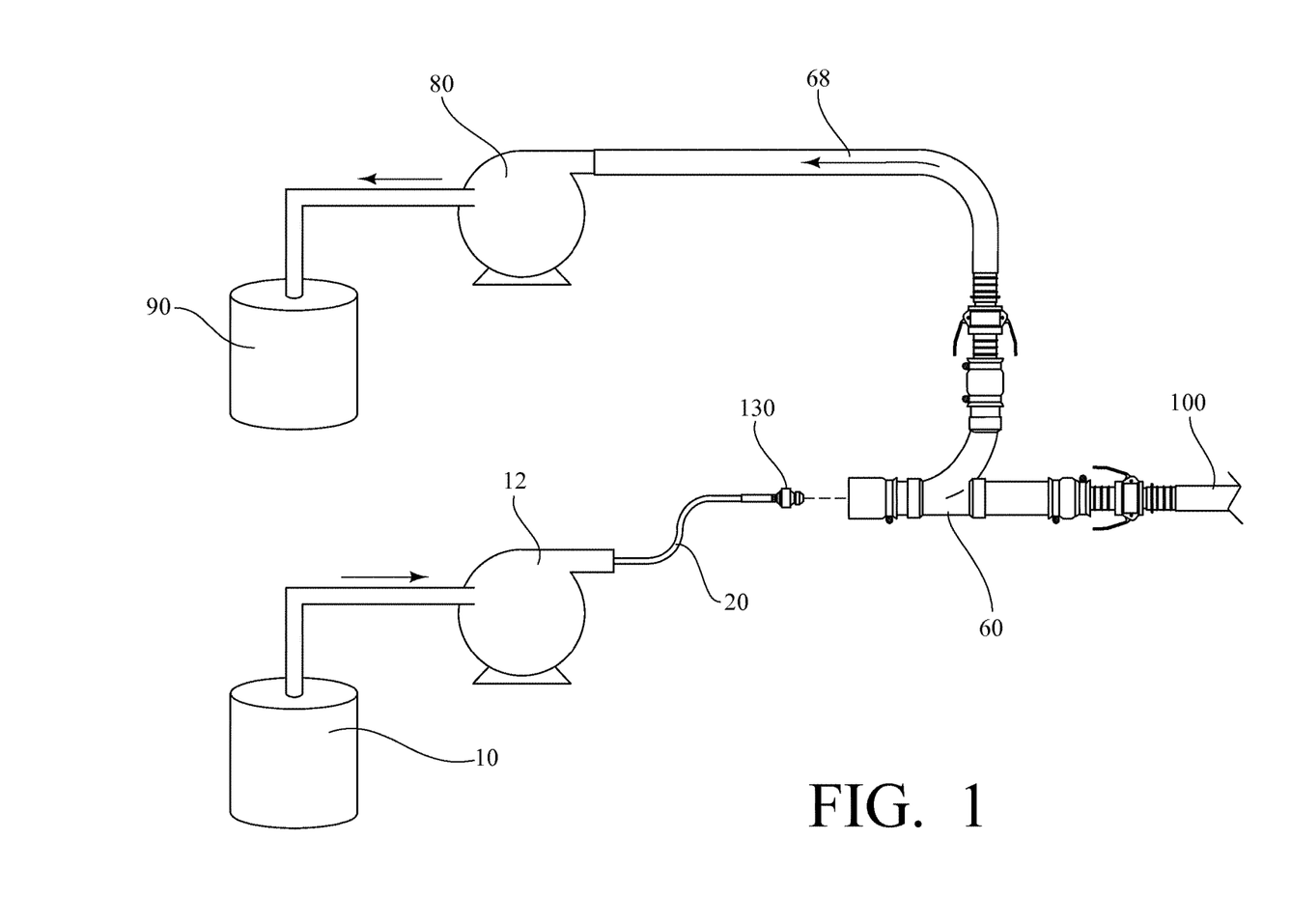
FIG. 1 is a schematic view of an exemplary apparatus for cleaning a waste line of an aircraft made in accordance with the present invention.

Referring now to the schematic view of FIG. 1, an exemplary apparatus in accordance with the present invention includes: a water tank 10 (or similar source of water or other cleaning solution); a high-pressure supply pump 12 operably connected to and in fluid communication with the water tank 10; a hose 20 operably connected to and in fluid communication with the supply pump 12; a nozzle 130 secured to a distal end of the hose 20; a connection assembly 60, the function and use of which will be further described below; a vacuum pump 80 operably connected to the connection assembly 60; and a wastewater collection tank 90 (which is preferably located external to the aircraft) operably connected to and in fluid communication with the vacuum pump 80. A waste line 100 is operably connected to and in fluid communication with the connection assembly 60.

Figure 1A:
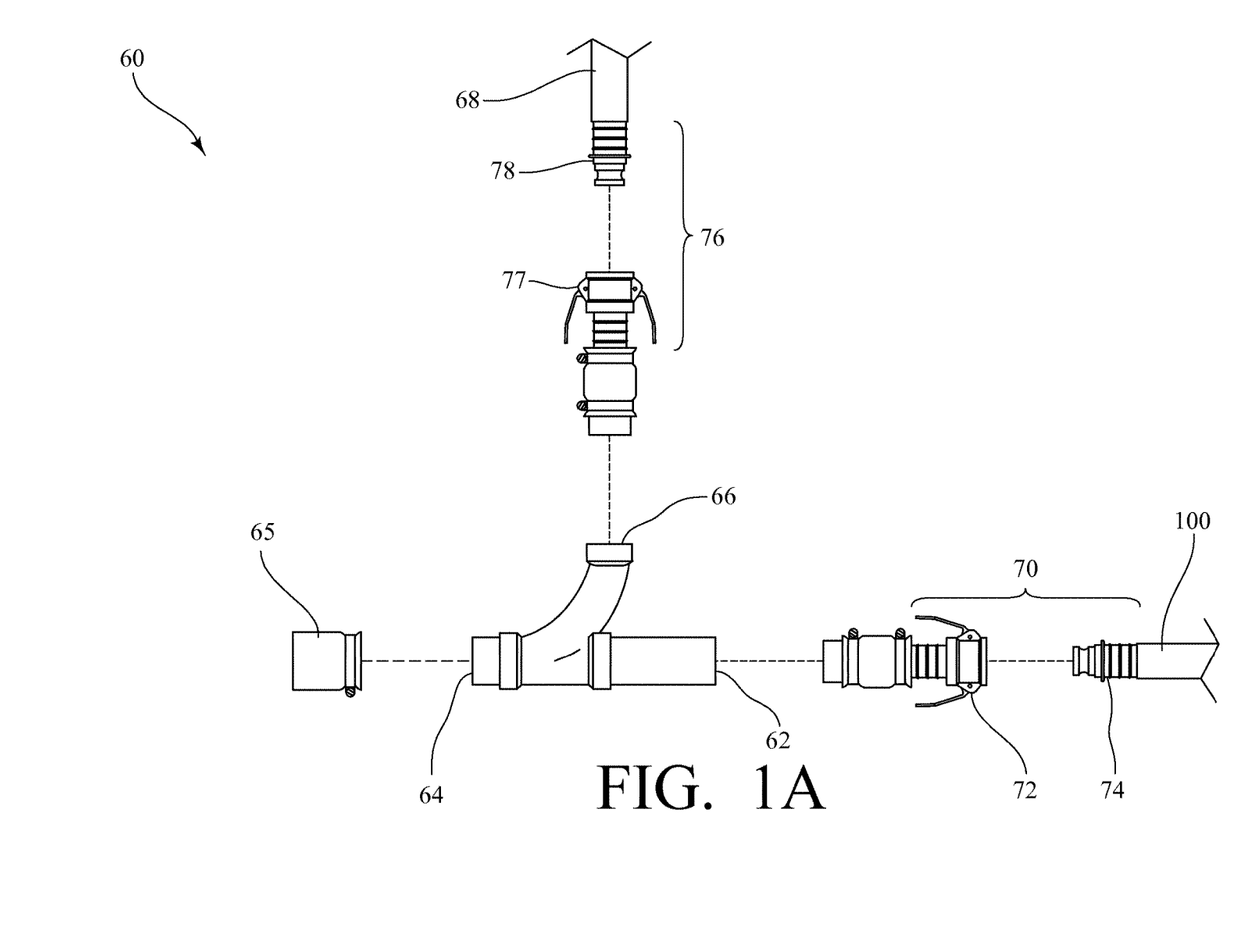
FIG. 1A is an exploded perspective view of the connection assembly of the exemplary apparatus of FIG. 1.

Referring now to FIG. 1A, in this exemplary embodiment, the connection assembly 60 is essentially a Y-connector defining three ports 62, 64, 66 that are in fluid communication with one another. The first port 62 of the connection assembly 60 is configured to be connected to the waste line 100. For example, the connection assembly 60 may be connected to the waste line 100 using a quick-connect fitting 70 comprised of a female fitting 72 clamped or otherwise secured to the connection assembly 60 and a male fitting 74 clamped or otherwise secured to the waste line 100. Of course, instead of such a quick-connect fitting, other forms of couplings or clamps could also be used to connect the first port 62 of the connection assembly 60 to the waste line 100 without departing from the spirit and scope of the present invention.

The second port 64 of the connection assembly 60 is configured to receive the hose 20 and nozzle 130 (as shown in FIG. 1) for introduction of the hose 20 and nozzle 130 into the waste line 100, as further described below. In this exemplary embodiment, the second port 64 of the connection assembly 60 is thus in-line with the first port 62; however, other configurations are also possible without departing from the spirit and scope of the present invention. Furthermore, in this exemplary embodiment, and as shown in FIGS. 1 and 1A, this second port 64 is covered with a jim cap 65 (or similar rubber cap or sealing member) that defines an opening therethrough for receiving the hose 20. Thus, the hose 20 is advanced through the opening of the jim cap 65, but as a result of the tight fit between the hose 20 and the jim cap 65, a seal is maintained around the hose 20 to prevent any leakage back through and out of the second port 64.

The third port 66 of the connection assembly 60 is configured to be connected to the vacuum pump 80 (as shown in FIG. 1) via a vacuum hose 68. For example, the connection assembly 60 may be connected to the vacuum hose 68 using a quick-connect fitting 76 comprised of a female fitting 77 clamped or otherwise secured to the connection assembly 60 and a male fitting 78 clamped or otherwise secured to the vacuum hose 68. Of course, instead of such a quick-connect fitting, other forms of couplings or clamps could also be used to connect the third port 66 of the connection assembly 60 to the vacuum hose 68 without departing from the spirit and scope of the present invention. Furthermore, with respect to the vacuum hose 68, it is preferably clear to allow an operator to see the debris and wastewater passing through the vacuum hose 68. In this way, the operator may make a visual confirmation that the apparatus is operating correctly.

In summary, the connection assembly 60 provides a sealed fluid communication between the water tank 10, the waste line 100, and the wastewater collection tank 90, which allows the apparatus of the present invention to be used without allowing water or other cleaning solution to come into contact with electrical wiring or other sensitive equipment in the vicinity of the aircraft waste lines.

Figure 2:
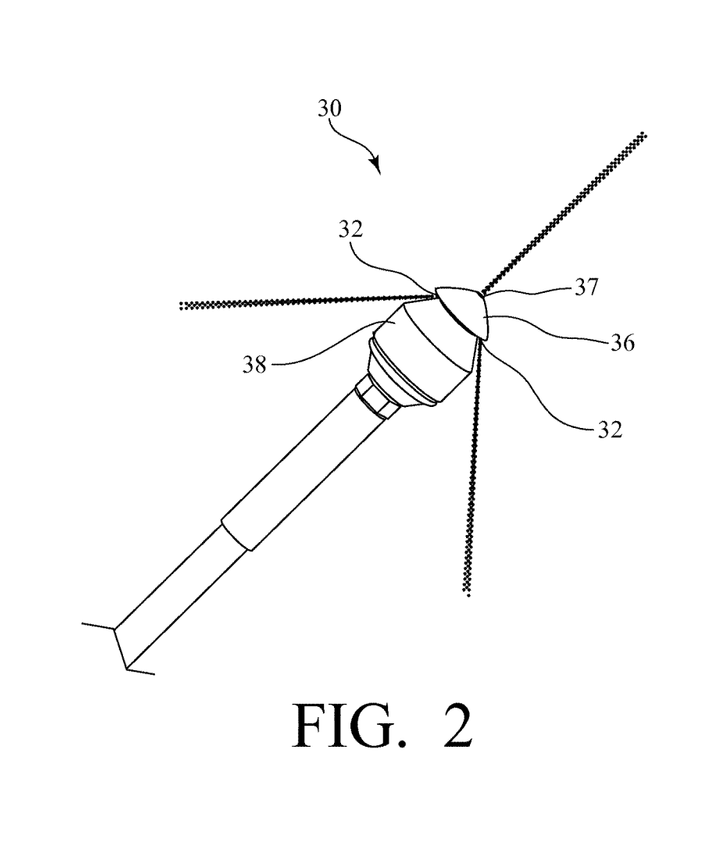
FIG. 2 is a view of an exemplary nozzle for use with the apparatus and method of the present invention.

Referring now to FIG. 2, one exemplary nozzle 30 for use with the present invention is a Model WV 1/4 Warthog® inlet self-rotary swivel sewer nozzle manufactured and distributed by StoneAge, Inc. of Durango, Colo. In use, water passing through this nozzle 30 is expelled not only from a bore 37 at the distal tip (or head) 36 of the nozzle 30, but also through two holes 32 oriented at approximately 45° angles (and directed rearward) relative to the longitudinal axis of the nozzle 30. When, in use, the distal tip 36 of the nozzle 30 is spinning or rotating relative to a central body 38 of the nozzle 30.

Figure 2A:
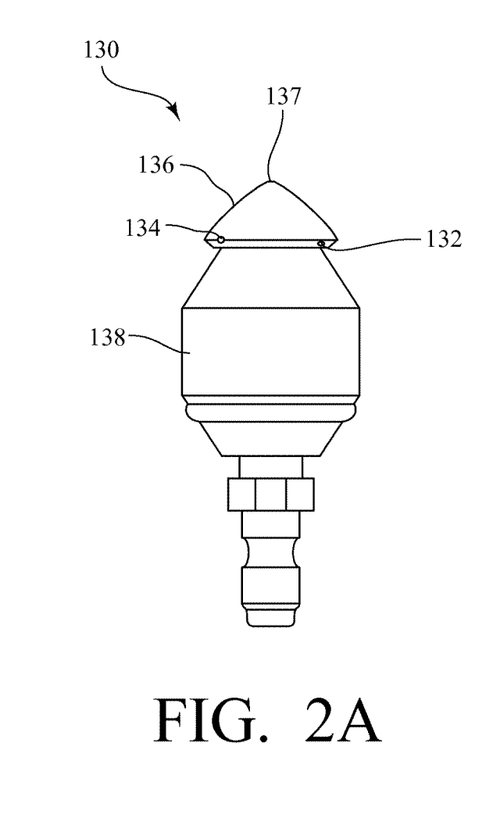
FIG. 2A is a side view of another exemplary nozzle for use with the apparatus and method of the present invention.

Referring now to FIG. 2A, another exemplary nozzle 130 for use with the present invention is a modified version of the Model WV 1/4 Warthog® inlet self-rotary swivel sewer nozzle manufactured and distributed by StoneAge, Inc. of Durango, Colo. Again, water passing through this nozzle 130 is expelled not only from a bore 137 at the distal tip (or head) 136 of the nozzle 130, but also through two holes 132 oriented at approximately 45° angles (and directed rearward) relative to the longitudinal axis of the nozzle 130. Furthermore, as contrasted to the nozzle 30 of FIG. 2, the nozzle 130 defines two additional holes 134 oriented on opposite sides of the distal tip 136, which direct the water at approximately 90° relative to the longitudinal axis of the nozzle 130, as further described below with respect to FIG. 4.

Figure 3:
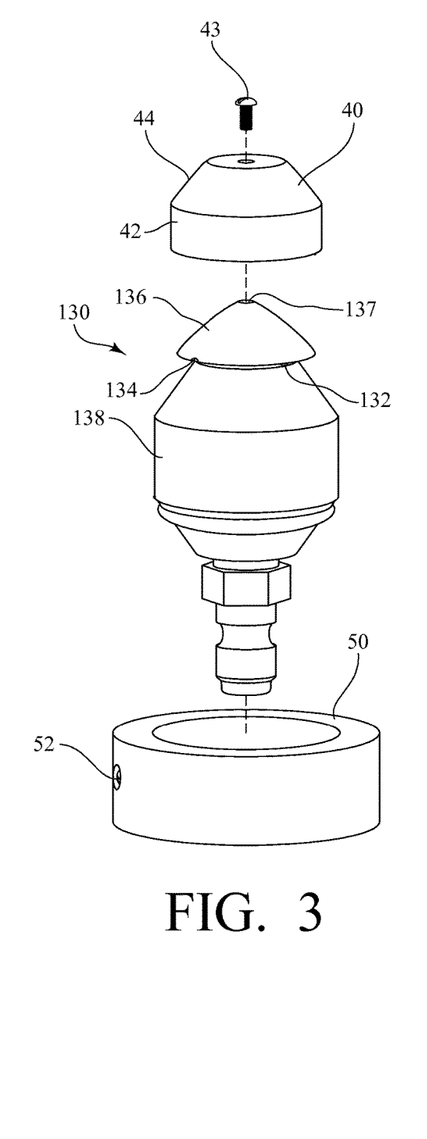
FIG. 3 is an exploded view of the nozzle of FIG. 2A, along with a protective cover and a protective ring.
Figure 3A:
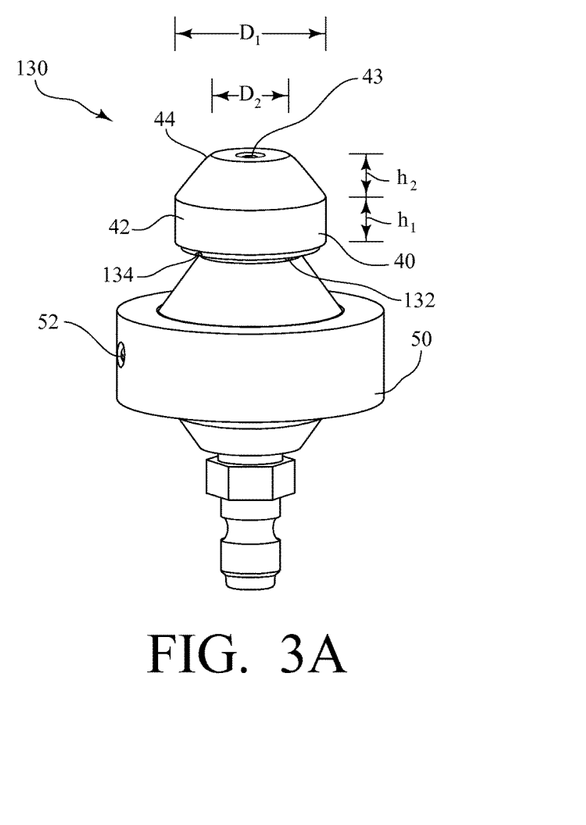
FIG. 3A is an assembled view of the nozzle, protective cover, and protective ring of FIG. 3.

Referring now to FIGS. 3 and 3A, the exemplary nozzle 130 is further provided with a protective cover 40 that fits over and engages the distal tip 136 of the nozzle 130. This protective cover 40 is preferably made of a plastic material, such as the synthetic resin marketed and distributed by E. I. du Pont de Nemours and Company of Wilmington, Del. under the registered trademark, Delrin®. The purpose of the protective cover 40 is to prevent metal-to-metal contact between the distal tip 136 of the nozzle 130 and the waste line 100 (which is typically made of titanium), thereby eliminating the scratching that can result from such metal-to-metal contact. Furthermore, to the extent that the nozzle 130 includes a bore 137 at its distal tip 136, the protective cover 40 closes the bore 137, so that water is only expelled through: (a) the two holes 132 which direct the water at approximately 45° angles (and directed rearward) relative to the longitudinal axis of the nozzle 130; and (b) the two additional holes 134 positioned on opposite sides of the distal tip 136, which direct the water at approximately 90° angles relative to the longitudinal axis of the nozzle 130, as further described below with respect to FIG. 5.

Referring still to FIGS. 3 and 3A, as described above, the protective cover 40 fits over and engages the distal tip 136 of the nozzle 130. The protective cover 40 can generally be characterized as having: a lower portion 42 that circumscribes the distal tip 136 of the nozzle 130; and an upper portion 44 that defines a leading surface with a generally conical shape. In this exemplary embodiment, the lower portion 42 has an outer diameter, $D_1$, of approximately 1.0 inches and a height, $h_1$, of approximately 0.1875 inches while the upper portion 44 has height, $h_2$, of approximately 0.5625 inches and tapers to a diameter, $D_2$, of approximately 0.50 inches. However, this is but one example of the dimensions of an appropriate protective cover. The dimensions of the protective cover 40 may be altered to account for nozzles of different sizes, or, for certain applications, it may be otherwise desirable to alter the geometry of the protective cover 40.

Referring again to FIGS. 3 and 3A, in this exemplary embodiment, a set screw 43 is used to secure the protective cover 40 to the nozzle 130, in which case it is the set screw 43 that actually engages and closes the bore 137 at the distal tip 136 of the nozzle 130. However, other means of attachment, including, for example, threading or certain adhesives, may also be used to secure the protective cover 40 to the nozzle 130 without departing from the spirit and scope of the present invention.

Referring still to FIGS. 3 and 3A, the exemplary nozzle 130 is also provided with a protective ring 50 that fits around and engages the central body 138 of the nozzle 130. This protective ring 50 is also preferably made of a plastic material, such as the synthetic resin marketed and distributed by E. I. du Pont de Nemours and Company of Wilmington, Del. under the registered trademark, Delrin®. The purpose of the protective ring 50 is also to prevent metal-to-metal contact between the central body 138 of the nozzle 130 and the waste line 100. In this exemplary embodiment, a set screw 52 is also used to secure the protective ring 50 to the nozzle 130; however, other means of attachment, including, for example, threading or certain adhesives, may also be used to secure the protective ring 50 to the nozzle 130 without departing from the spirit and scope of the present invention.

Referring again to FIG. 1, in practice, an exemplary method for cleaning a waste line of an aircraft in accordance with the present invention commences by disconnecting a selected waste line 100 from its associated waste collection receptacle, thereby providing access to the waste line 100. The first port 62 of the connection assembly 60 is then connected to the waste line 100. As described above, the connection assembly 60 may be connected to the waste line 100 using a quick-connect fitting 70. Once the connection assembly 60 is connected to the waste line 100, the vacuum hose 68 is connected to the third port 66 of the connection assembly 60. As described above, the connection assembly 60 may also be connected to the vacuum hose 68 using a quick-connect fitting 76. An opposite end of the vacuum hose 68 is extended outside of the aircraft (for example, through a cargo door) and connected to the vacuum pump 80. The vacuum pump 80 is connected to and in fluid communication with the wastewater collection tank 90.

Now, with respect to the second port 64 of the connection assembly 60, this second port 64 is in-line with the first port 62. Furthermore, in this exemplary embodiment, this second port 64 is covered with a jim cap 65 (or similar rubber cap or sealing member) that defines an opening therethrough for receiving the hose 20. Thus, and as described above, the hose 20 is advanced through the opening of the jim cap 65, but as a result of the tight fit between the hose 20 and the jim cap 65, a seal is maintained around the hose 20 to prevent any leakage back through and out of the second port 64.

After advancing the hose 20 through the jim cap 65, the nozzle 130 is secured to the distal end of the hose 20. The jim cap 65 is then clamped or otherwise secured to the second port 64 of the connection assembly 60. The hose 20 can then be manually advanced forward through the connection assembly 60 and into the waste line 100.

Now, in some exemplary implementations, it may be necessary to create a vent prior to activating the supply pump 12 in order to prevent air lock in the waste line 100 and potential flooding in the aircraft cabin. To create such a vent, the waste line 100 may be disconnected from the last accessible connection at an opposite end of the aircraft. Alternatively, such a vent can be created by opening the lay-bowl dump valve in the lavatory in the passenger area of the aircraft.

Once all appropriate connections have been made, and, to the extent necessary, a vent has been created, the vacuum pump 80 is first activated, and an operator should see the debris and wastewater start flowing through the vacuum hose 68 (i.e., the debris and wastewater accumulated during the most recent flight of the aircraft). The supply pump 12 is then activated at a pressure of approximately 1500 psi or less, which forces water through the hose 20 and out of the nozzle 130 into the waste line 100. Assuming that no leaks are detected and there is a proper flow of wastewater through the vacuum hose 68, using the supply pump 12, the pressure is increased to approximately 3900 psi, and the hose 20 and nozzle 130 are slowly advanced through the waste line 100. For maximum cleaning efficiency, it is believed that the nozzle 130 should pass a given section of the waste line 100 eight to twelve times.

Figure 4:
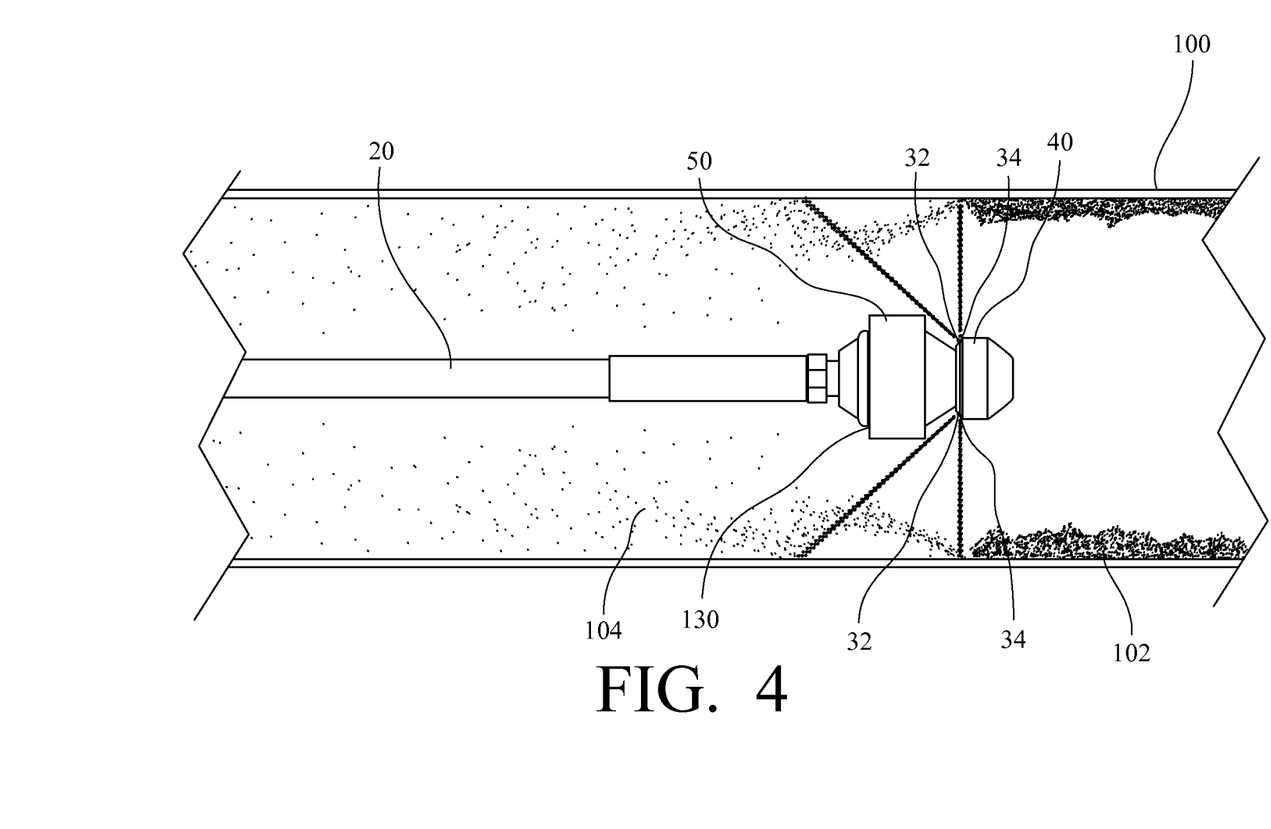
FIG. 4 is a view of the assembly of the nozzle, protective cover, and protective ring of FIG. 3A as used to clean a waste line of an aircraft.

FIG. 4 is a view of the exemplary nozzle 130 in operation within the waste line 100 of an aircraft. In use, the distal tip 136 of the nozzle 130 (and the protective cover 40) rotates or spins while being advanced through the waste line 100. The two holes 34 oriented at approximately 90° relative to the longitudinal axis of the nozzle 130 create a direct blast on the inner surface of the waste line 100, removing calcium and mineral build-up 102 from the inner surface of the waste line 100. The two holes 32 oriented at approximately 45° relative to the longitudinal axis of the nozzle 130 assist in moving the loosened debris 104 down the waste line 100 and away from the nozzle 130. Furthermore, the two holes 32 oriented at approximately 45° propel the nozzle 130 forward through the waste line 100. At the same time, however, the protective cover 40 and protective ring 50 prevent metal-on-metal contact between the nozzle 130 and the waste line 100 as the nozzle 130 moves through the waste line 100. Finally, throughout this process, the vacuum pump 80 is drawing debris 104 and wastewater out of the waste line 100 through the connection assembly 60 and the vacuum hose 68 and collecting that debris and wastewater in the wastewater collection tank 90.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the sprit or scope of the invention.

What is claimed is:

1. An apparatus for cleaning a waste line of an aircraft, comprising:
   a source of cleaning solution;
   a hose in fluid communication with the source of cleaning solution;
   a nozzle secured to a distal end of the hose and defining one or more holes for expelling the cleaning solution into a waste line;
   a protective cover composed of a plastic material that fits over and engages a distal tip of the nozzle, such that an apex of the protective cover is forward of the distal tip of the nozzle, and the protective cover prevents the nozzle from expelling the cleaning solution in a forward direction into the waste line; and
   a protective ring composed of a plastic material that fits around and engages a central body of the nozzle, wherein the protective ring is separate and at a spaced distance from the protective cover.

2. The apparatus for cleaning a waste line of an aircraft as recited in claim 1, wherein the nozzle defines (a) one or more holes for expelling the cleaning solution that are oriented at approximately 45° and directed rearward relative to a longitudinal axis of the nozzle, and (b) one or more holes for expelling the cleaning solution that are oriented at approximately 90° relative to the longitudinal axis of the nozzle.

3. The apparatus for cleaning a waste line of an aircraft as recited in claim 1, and further comprising:
   a supply pump operably connected to and in fluid communication with the source of cleaning solution via the hose for delivering the cleaning solution to the nozzle.

4. The apparatus for cleaning a waste line of an aircraft as recited in claim 1, and further comprising:
   a vacuum pump; and
   a connection assembly defining three ports that are in fluid communication with one another, a first port being configured to be connected to the waste line, a second port being configured to receive the hose and the nozzle for introduction of the hose and the nozzle into the waste line, and a third port being configured to be connected to the vacuum pump.

5. The apparatus for cleaning a waste line of an aircraft as recited in claim 4, and further comprising a collection tank which is operably connected to and in fluid communication with the vacuum pump.

6. An apparatus for cleaning a waste line of an aircraft, comprising:
   a source of cleaning solution;
   a supply pump operably connected to and in fluid connection with the source of cleaning solution;
   a hose operably connected to and in fluid communication with the supply pump;
   a nozzle secured to a distal end of the hose and defining one or more holes for expelling a cleaning solution into a waste line;
   a protective cover composed of a plastic material that fits over and engages a distal tip of the nozzle, extending over the distal tip of the nozzle, such that the protective cover prevents the nozzle from expelling the cleaning solution in a forward direction into the waste line;
   a vacuum pump; and
   a connection assembly defining three ports that are in fluid communication with one another, a first port being configured to be connected to the waste line, a second port being configured to receive the hose and the nozzle within the connection assembly for introduction of the hose and the nozzle into the waste line, and a third port being configured to be connected to the vacuum pump.

7. The apparatus for cleaning a waste line of an aircraft as recited in claim 6, wherein the nozzle defines (a) one or more holes for expelling the cleaning solution that are oriented at approximately 45° and directed rearward relative to a longitudinal axis of the nozzle, and (b) one or more holes for expelling the cleaning solution that are oriented at approximately 90° relative to the longitudinal axis of the nozzle.

8. The apparatus for cleaning a waste line of an aircraft as recited in claim 6, wherein the second port of the connection assembly is in-line with the first port.

9. An apparatus for cleaning a waste line of an aircraft, comprising:
   a source of cleaning solution;
   a hose in fluid communication with the source of cleaning solution;
   a nozzle secured to a distal end of the hose, said nozzle including a central body and a distal tip, wherein the distal tip rotates when in use, and wherein the distal tip defines (a) one or more holes for expelling the cleaning solution that are oriented at approximately 45° and directed rearward relative to a longitudinal axis of the nozzle, and (b) one or more holes for expelling the cleaning solution that are oriented at approximately 90° relative to the longitudinal axis of the nozzle; and
   a protective cover composed of a plastic material that fits over and engages the distal tip of the nozzle, such that the protective cover extends over the distal tip of the nozzle, is forward of the one or more holes that are oriented at approximately 45° and directed rearward relative to a longitudinal axis of the nozzle, and prevents the nozzle from expelling the cleaning solution in a forward direction into the waste line.

10. The apparatus for cleaning a waste line of an aircraft as recited in claim 9, and further comprising:
    a vacuum pump; and
    a connection assembly defining three ports that are in fluid communication with one another, a first port being configured to be connected to the waste line, a second port being configured to receive the hose and the nozzle for introduction of the hose and the nozzle into the waste line, and a third port being configured to be connected to the vacuum pump.

\* \* \* \* \*